US005255970A

United States Patent [19]

Theosabrata

[11] Patent Number: 5,255,970

[45] Date of Patent: Oct. 26, 1993

[54] STORAGE CABINET

[76] Inventor: Yos S. Theosabrata, Kebon Jeruk 18/1B, Jakarta-11160, Indonesia

[21] Appl. No.: 888,967

[22] Filed: May 26, 1992

[51] Int. Cl.[5] .......... E06B 9/00

[52] U.S. Cl. .......... 312/297; 312/107; 312/330.1

[58] Field of Search .......... 312/297, 298, 299, 271, 312/272, 7.1, 107, 330.1

[56] References Cited

U.S. PATENT DOCUMENTS

| | | | |
|---|---|---|---|
| 544,138 | 8/1895 | Ullrich | 312/297 |
| 556,394 | 3/1896 | Yawman | 312/297 |
| 983,342 | 2/1911 | Bauer | 312/297 |
| 1,107,985 | 8/1914 | Moskowitz | 312/297 |
| 3,814,493 | 6/1974 | Radke | 312/297 |
| 4,153,311 | 5/1979 | Takahashi | 312/107 |
| 4,217,012 | 8/1980 | Klaus | 312/297 |
| 4,279,454 | 7/1981 | Koiso et al. | 312/297 |
| 4,389,078 | 6/1983 | Streit | 312/107 |
| 4,715,669 | 12/1987 | Baillie et al. | 312/330.1 |

FOREIGN PATENT DOCUMENTS

| | | | |
|---|---|---|---|
| 1176820 | 4/1959 | France | 312/297 |

*Primary Examiner*—Victor N. Sakran
*Attorney, Agent, or Firm*—Knobbe, Martens, Olson & Bear

[57] ABSTRACT

A tall, roll-top cabinet for storing articles such as compact disc cases. The cabinet has a sliding door formed of a series of horizontal slats and short spacers bonded to a flexible backing. The spacers are disposed at the side edges of the door so that they ride in guide channels with the edges of the larger slats to provide the necessary support. The short spaces decrease the weight of the door, provide a pleasing alternating pattern for the door, and enhance the use of see-through backing. Horizontal ledges in the cabinet support the sides of articles being stored. Resilient fingers may extend from the walls of the frame to form ledges for thin articles such as single compact disc cases, or the fingers can be depressed to permit double compact disc cases to be stored.

9 Claims, 8 Drawing Sheets

30
20
102
100a
104
100b
90
62
94
24
22

STORAGE CABINET

BACKGROUND OF THE INVENTION

The present invention relates to storage cabinets, and more particularly to a storage cabinet for holding a plurality of recorded audio-visual articles such as compact discs (CDs), video tapes, audio tapes, shoes, etc.

With the recent transition of loyalties from vinyl records to CDs, there has been an explosion of demand for handy storage units for these articles A common means for storing CDs has been to array them along an exposed shelf with a front bar adapted to uplift the front of the CDs and retain them on the shelf. Unfortunately, the shelves are either wall mounted or rest on table tops and are not designed to be easily moved. Other storage means have provided a simple box-like frame with shelves within which the CDs lie in. The exposed CDs are somewhat unsightly and the storage unit becomes quite bulky for large amounts of CDs. Other storage means have combined the simple frame with an exterior cabinet having front swinging doors. This type of cabinet requires a large space at the front of the cabinet for the doors to swing open.

Another common problem with prior CD storage units has been their relative inflexibility with regard to receiving both single and double CDs. Double CDs, having approximately twice the thickness of single CDs, will not fit in a storage cabinet sized only for single CDs. Some manufacturers have introduced shelving which provides one or two spaces for double CDs and the rest for single CDs. This is limiting, especially for opera and classical music aficionados who often purchase CD packages with two or more CDs included.

Due to the drawbacks of prior art storage cabinets, there is a need for an improved cabinet which is both lightweight and has a large storage capacity. Additionally, there is a need for an attractive CD storage cabinet which may be placed in a room alongside expensive stereo equipment and requires no more space when open than when closed. Moreover, there is a need for a lightweight, mobile storage cabinet with a large CD storage capacity which may be placed on the floor or on a desk or table. Finally, there is a need for a storage cabinet with all of the aforementioned features which can selectively store various sized CD boxes without any manual conversion.

SUMMARY OF THE INVENTION

A storage cabinet with a base and two upstanding side panels having a sliding door sized to slide within guide channels on the inside surface of the side panels is provided by the present invention. The door is a roll-top type having horizontal slats fixed to a continuous flexible backing. The door may be alternately raised and lowered for exposing and covering the interior of the cabinet. The present door employs a plurality of spacers between the horizontal slats that also slide within the channel but do not extend across the entire width of the door. The weight of the door is thus greatly reduced and the exterior provided with a pleasing alternating series of slats and spacers defining spaces in which the backing is visible.

In the preferred embodiment, there are two long horizontal slats separated by two short spacers on each side of the sliding door in a repeated fashion along the length of the door. The guide channel in the interior surfaces of the side panels preferably comprises an inverted U-shape which the door slides in. The door thus slides up and over the top side of the storage cabinet when opening, the upward resistance to sliding gradually becoming less and less as the door slides down the rear side of the cabinet.

The storage cabinet additionally provides a means for storing and arraying articles in the interior, the means being exposed by the sliding door as it is raised up the front of the cabinet. The means for storing articles within the cabinet includes a combination of fixed and resilient ledges which may be arranged to support varying thicknesses of articles. In the preferred embodiment, the interior of the cabinet includes a storage frame having alternating fixed and resilient ledges. This storage arrangement is particularly suited for storing either thin or thick articles such as single and double CDs, respectively. Single CDs will fit on both the fixed and resilient ledges while double CDs will lie on the fixed ledges and depress the resilient ledges.

Advantageously, the resilient ledges comprise fingers cantilevered from the side walls of the frame and including protrusions which extend a sufficient distance to support thin articles. Conversely, thick articles contact and displace the fingers upon insertion. Most preferably the storage means including the fixed and resilient ledges are integral with molded inserts sized to fit over the walls of the frame in the interior of the storage cabinet.

DETAILED DESCRIPTION OF THE INVENTION

Figure 1:
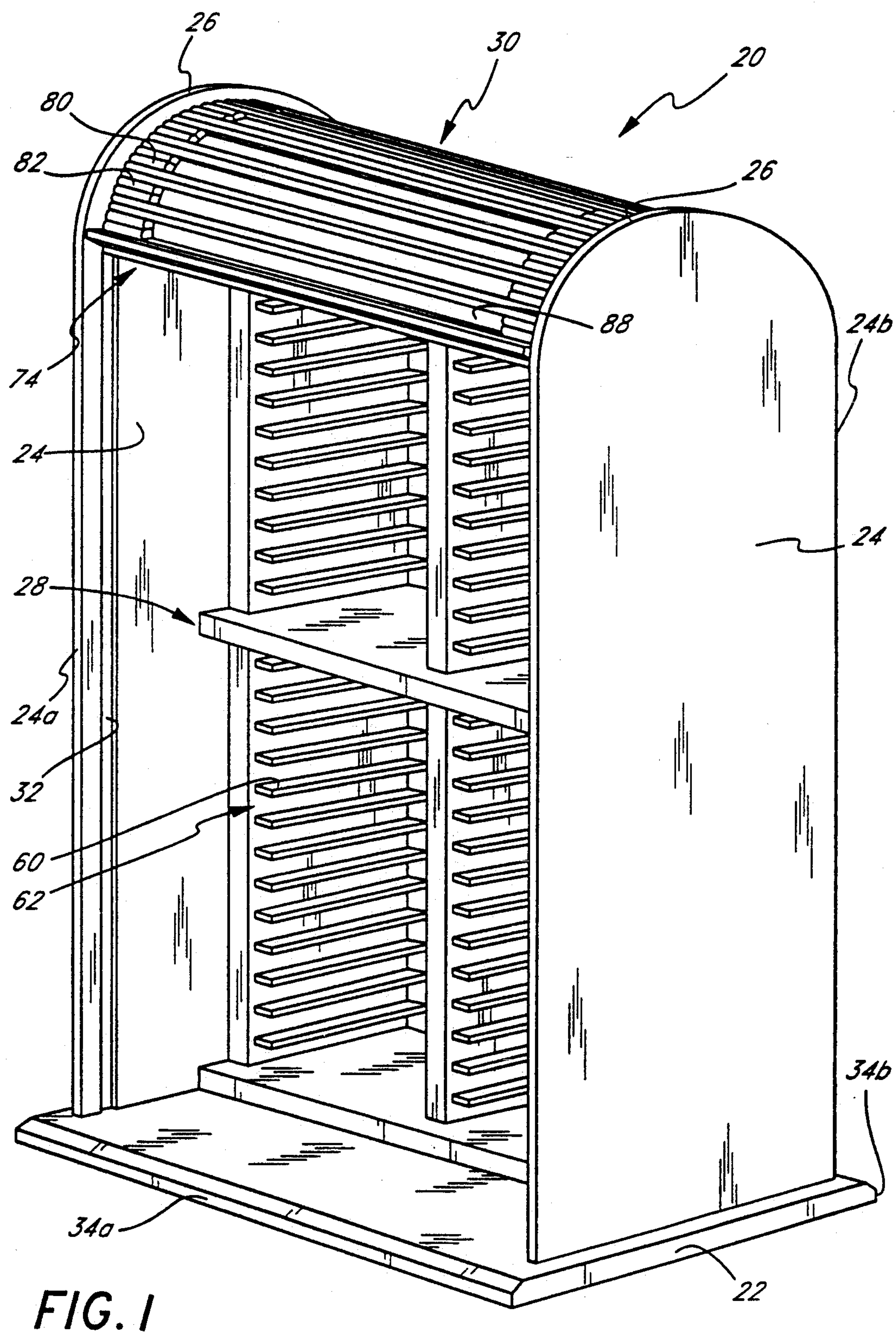
FIG. 1 is a perspective view of the storage cabinet of the present invention with the sliding door open.

The storage cabinet of the present invention as shown in FIG. 1 is a free-standing piece of furniture designed to store a number of articles in a minimum of floor space. It is possible to store numerous types of articles in the storage cabinet of the present invention, and thus the size parameters given herein are for example only and not meant to limit the invention. In general, however, the storage cabinet functions best as a tall, narrow piece of furniture adapted to hold a number of lightweight articles such as flat, rigid cases holding compact discs (CDs). The cabinet embodies a novel and distinctive closing means which covers and protects the contents within and can be retracted to expose the same contents without projecting outside the body of the cabinet.

Referring to FIG. 1, the storage cabinet is shown standing upright on a base 22. Two vertical side panels 24 extend upward from the base 22 and terminate in semi-circular upper edges 26. A storage frame 28 mounts in a region between the panels 24. The storage frame 28 substantially fills the region between the panels 24 and extends upward to a height approximately where the arcuate edges 26 of the panels begin. The frame 28 preferably attaches to the panels 24 to provide structural support. A sliding door 30 travels within guide channels 32 in the interior sides of the panels 24 to completely cover and hide the storage frame 28 within, when in its closed position. Advantageously, when opened, the sliding door 30 exposes the entire storage frame 28 without requiring lateral clearance outside the upstanding profile of the storage cabinet 20.

Figure 3:
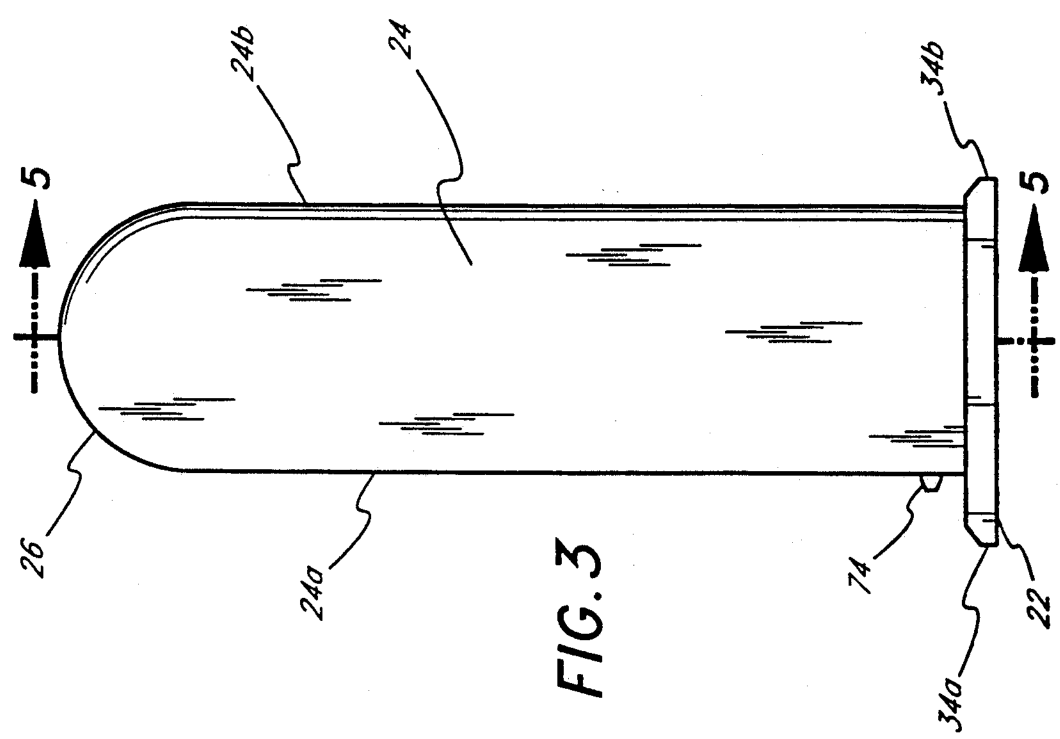
FIG. 3 is a side elevational view of the storage cabinet.
Figure 2:
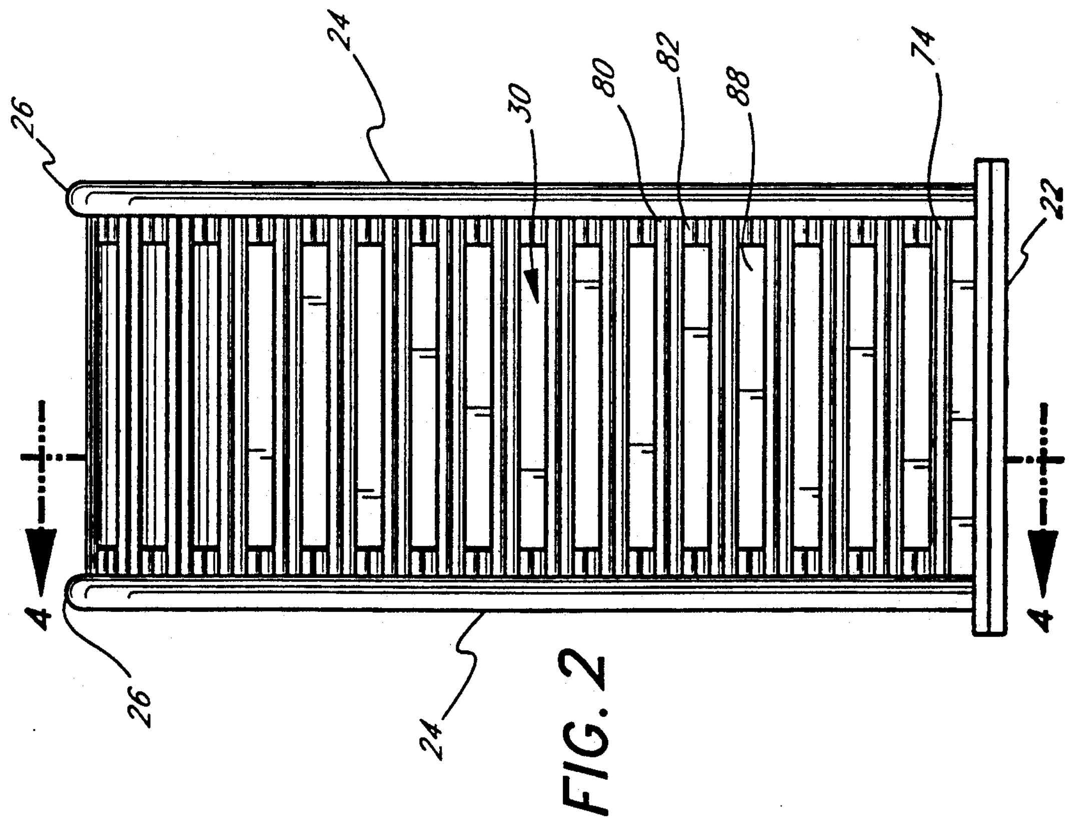
FIG. 2 is a front elevational view of the storage cabinet with the sliding door closed.

In reference to FIGS. 1 and 3, the base 22 comprises a generally flat, rectangular plate. Front and back edges 34*a,b* of the base 22 are beveled downward along the top to remove any sharp corners which might wear or chip away upon extended use, or would present a sharp protrusion for one to stub a toe on. The width of the base 22 depends on the type of articles stored within. The length of the base 22 is similarly dependent on the articles stored within, but the front edge 34*a* extends several inches farther forward from the panels 24 than the back edge 34*b* does in a rearward direction. The extension of the base 22 in this manner substantially prevents tall cabinets from tipping forward. The back edge 34*b* is truncated sooner to allow the cabinet 20 to be positioned closer to an interior wall. Normally, the storage cabinet 20 stands proximate such a wall, or in a corner of a room, and thus is prevented from falling over backwards by such structural barriers.

The vertical panels 24 securely mount to the base 22 by means of screws or bolts (not shown) upward through the bottom of the base. Preferably, there are at least two screws holding each panel 24 to the base 22. The panels 24 extend upward a height dependent on the number and type of articles stored within. A single continuous channel 32 on the interior side of each panel 24 extends from the bottom corner of the front edge 24*a* of each panel upward and follows the contour of the upper semi-circular edges 26 to descend along the rear edge 24*b* to the bottom corner. The guide channel 32 defines an elongated, inverted U-shaped guide just inside and parallel to the edges of the panels 24. The channel 32 is configured to receive the side edges of the sliding door 30 and guide the door from an open position at the front of the storage cabinet 20 to a closed position at the rear of the cabinet. The semi-circular upper edges 26 of the panels 24 are parallel to the shape of the channels 32 and also the sliding door 30. However, the shape of the upper edges 26 is not limited to an arcuate configuration.

Figure 5:
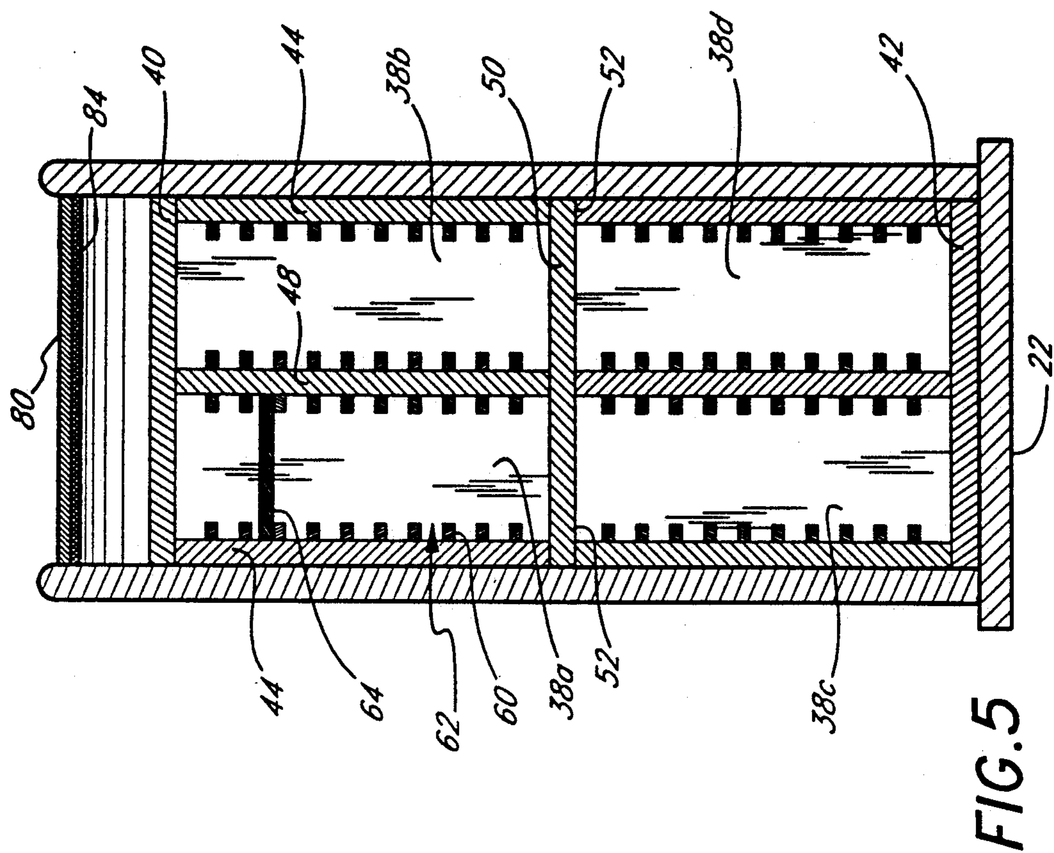
FIG. 5 is a cross-sectional view of the storage cabinet along lines 5—5 of FIG. 3.
Figure 4:
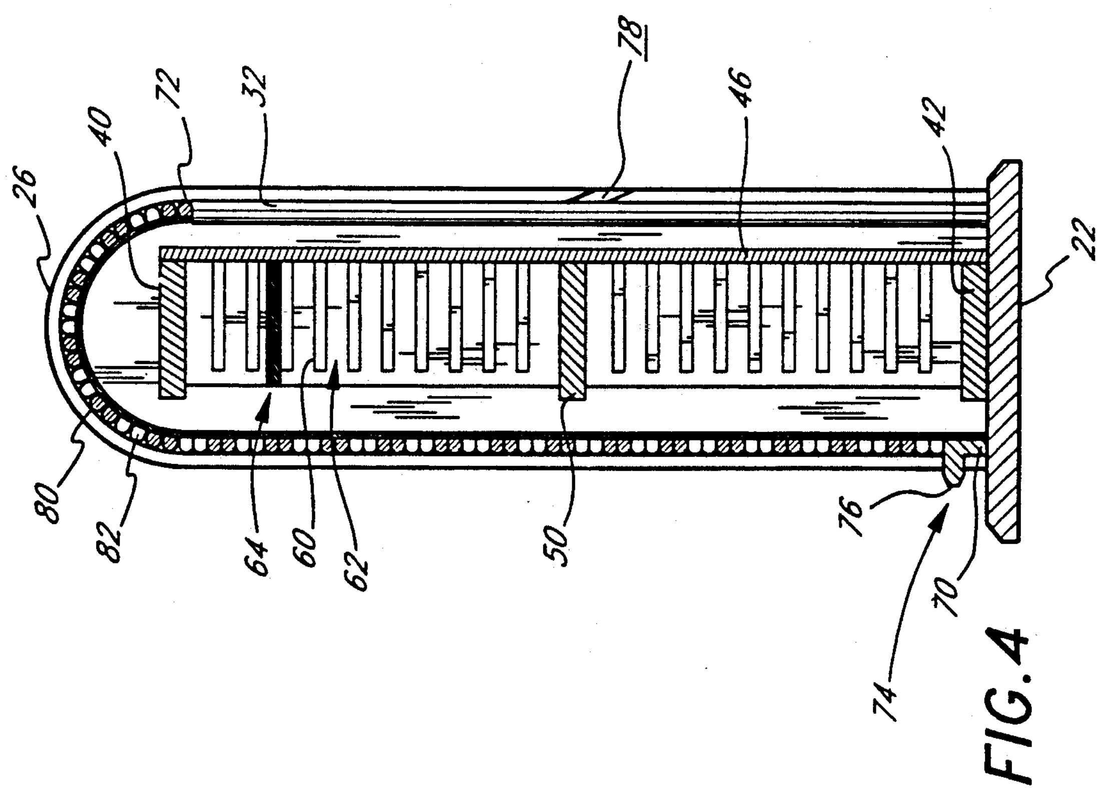
FIG. 4 is a cross-sectional view of the storage cabinet along lines 4—4 of FIG. 2.

Referring to the cross-sectional views of FIGS. 4 and 5, the storage frame 28 is shown within the storage cabinet 20. The width of the storage frame 28 spans from the interior surface of one panel 24 to the other. In this regard, the storage frame 28 provides structural support for the panels 24 and is preferably fastened by glue or other means to the panels. Optionally, additional cross struts (not shown) may be provided to partially or wholly support the panels 24. The storage frame 28 is centered with respect to the front and back edges 24*a,b* of the panels 24 of the storage cabinet 20. In general, the storage frame 28 comprises a box standing on end which is open to the front and closed at the rear.

The storage frame 28 may be constructed in any number of configurations well known in the art, one such configuration is described herewith. In the preferred embodiment, the storage frame 28 comprises a top member 40 and bottom member 42, spaced apart in a parallel relationship and connected by left and right side walls 44. A rectangular shape is defined by the combination of the left and right side walls 44 and top and bottom members 40, 42. A rear wall 46 attaches to the back edges of each of the aforesaid components comprising the rectangular shape by any suitable means.

The space within the exterior rectangular shape of the frame 28 may contain means for storing large articles or, in the preferred embodiment shown, be divided into sub-areas which are adapted to receive and display smaller articles therein. The sub-areas may contain shelves stacked vertically for storing articles such as compact disc cases, video boxes, tape boxes, floppy disks or diskettes, books, etc.

As seen in FIG. 5, the construction of the storage frame 28 is such that four equivalent quadrants 38*a–d* are separated by a cross formed by the intersection of a center wall 48 and middle cross beam 50, and by the rectangular border of the top and bottom members 40, 42 and side members 44. The center wall 48 attaches to the lower side of the top member 40 and extends and attaches to the upper side of the bottom member 42. The center wall 48 intersects and overlaps the middle cross beam 50 at the center point of the storage frame 28 in a perpendicular relation. Horizontal recesses 52 in the interior mid-point of the left and right side walls 44 support the middle cross beam 50 which fits snugly within the recesses across the side walls. The center wall 48 and middle cross beam 50 include mating rectangular slots (not shown) at their intersection point so that they may be slid together and their widths align. The middle cross beam 50 includes a slot cut at the rear mid-point having a width equal to the thickness of the center wall 48 and a depth of one-half the width of the cross beam. Likewise, a similarly sized slot is cut at the front mid-point of the center wall 48 from the front of the wall to a point half way back along its width. The two slots in the center wall 48 and middle cross beam 50 mate to allow the widths of these two members to align.

The top and bottom members 40, 42, side walls 44, center wall 48 and middle cross beam 50 all terminate in a plane at the rear of the support frame 28 to which the rear wall 46 attaches. At the front, the top and bottom members 40, 42 and middle cross beam 50 extend slightly forward of the side walls 44 and center wall 48. The storage frame 28 connects in the manner described above and is securely fastened with any suitable fastening means. Advantageously, the components of the storage cabinet 20 are easily assembled and, in one embodiment, the cabinet is sold inexpensively as a disassembled kit.

In one embodiment shown in FIGS. 4 and 5, a means of storing articles 64 comprises rows of narrow opposing horizontal ledges 60 mounted securely on the interior of the side walls 44 and both sides of the center wall 48. Each section or quadrant 38*a–d* comprises aligned pairs of horizontal ledges 60, on either the left or right side wall 44 and the center wall 48, which oppose each other to define stations 62 for storing individual articles 64. Alternatively, the ledges 60 may be so spaced as to define larger stations 62 for storing a plurality of articles 64. The ledges 60 are separated a vertical distance to allow space for freely sliding the particular article 64 within the station 62. Each article 64 is supported on its left and right side by the opposing ledges 60. To ensure the articles 64 will be adequately supported on the ledges 60, a minimum distance is required between the outwardly projecting edge of each ledge and the opposite wall. This minimum distance is equivalent to a width slightly smaller than the width of the article 64 being stored. As mentioned above, the stations 62 may be sized differently for each separate quadrant 38*a-d*, or even within a single quadrant.

In an alternative configuration, the ledges 60 described above may be removably mounted in the side walls 44 and center wall 48 of the storage frame 28. In this regard, slots sized to snugly receive the ledges 60 are cut at regular vertical intervals into the walls 44, 48. The owner of the storage cabinet 20 selectively inserts ledges 60 in those slots which would create stations 62 sized to conform to the articles 64 being stored.

The storage cabinet 20 of the present invention may be constructed from any suitable material such as wood, plastic, fiberglass, metal, composites, etc. Preferably, for its aesthetic value, cost and weight advantages, the cabinet 20 is fabricated from wood.

Referring to FIGS. 4 and 5, the sliding door 30 of the storage cabinet 20 hides the storage frame 28 within when in its closed position. Alternately, the storage frame 28 is fully exposed when the sliding door 30 is in its open position. As the door 30 raises from its closed position, it gradually exposes the contents of the storage cabinet 20, allowing access to the lower region first. Since the door 30 slides within the guide channels 32 freely but with some friction, the door advantageously holds its position when only partially raised. The counterbalancing effect of the door 30 as it travels over the top and along the rear of the cabinet 20 further assists in retaining the door at a partially open position.

The path of one elongated, inverted U-shaped guide channel 32, within which the sliding door 30 travels, is shown in FIG. 4. The sliding door 30 is flexibly arranged so that it may follow this channel 32 over the top side of the storage cabinet 20 and back to a position behind the storage frame 28. In this respect, the total length of the sliding door 30 equals the height from the base 22 of the storage cabinet 20 to the beginning of the upper arcuate portion 26, plus the distance along the channel 32 over the arcuate portion. When closed, as shown in FIG. 4, a first end 70 of the sliding door 30 contacts the base 22 at the front of the storage cabinet 20, and a second end 72 terminates at the upper rear of the storage cabinet at a point where the arcuate section 26 and rear edge 24*b* meet. In its fully open position, the sliding door 30 travels along the rear side of the cabinet 20 and exposes the complete height of the storage frame 28 to the front.

To facilitate movement of the sliding door 30, a handle 74 extending across the width of the sliding door is provided at the first end 70. This handle 74 comprises a bar 76 extending forward from the plane of the sliding door 30. The bar 76 may be gripped easily by a person and lifted up or down to transmit a force to the first end 70 of the sliding door 30 for raising or lowering it.

As seen in FIG. 4, the entire door 30 is initially installed via an angled path 78 cut into the rear side of the channels 32 at the back of the cabinet 20. Advantageously, the storage cabinet 20 is assembled and may be moved without the sliding door 30 to avoid any damage to the relatively fragile door. Additionally, the door 30 may be removed and repaired or replaced easily after assembly. Importantly, this permits the unit to be assembled more quickly, thereby lowering manufacturing costs. The path 78 makes a slight downward angle with the vertical and thus the first end 70 of the door 30 may be slid up into the channel 32 and fed through until its entirety has been received by the channel. Likewise, when the door 30 is removed, the second end 72 is guided down the exit path 78 and the rest of the door follows. Without manual interference, the tendency of the door 30 when closing is to continue down the rear channel 32 rather than exit from the path 78, ensuring smooth operation.

Figure 6:
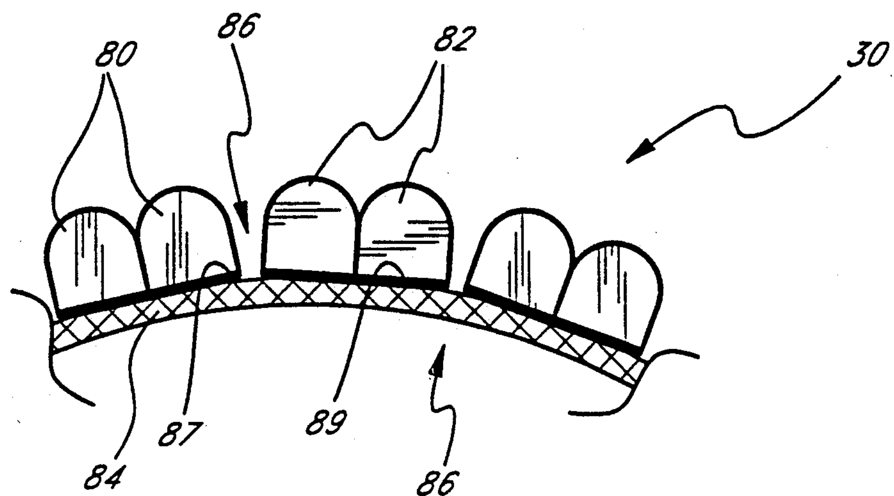
FIG. 6 is a detail showing a side view of an arcuate section of the sliding door of the present invention.
Figure 7:
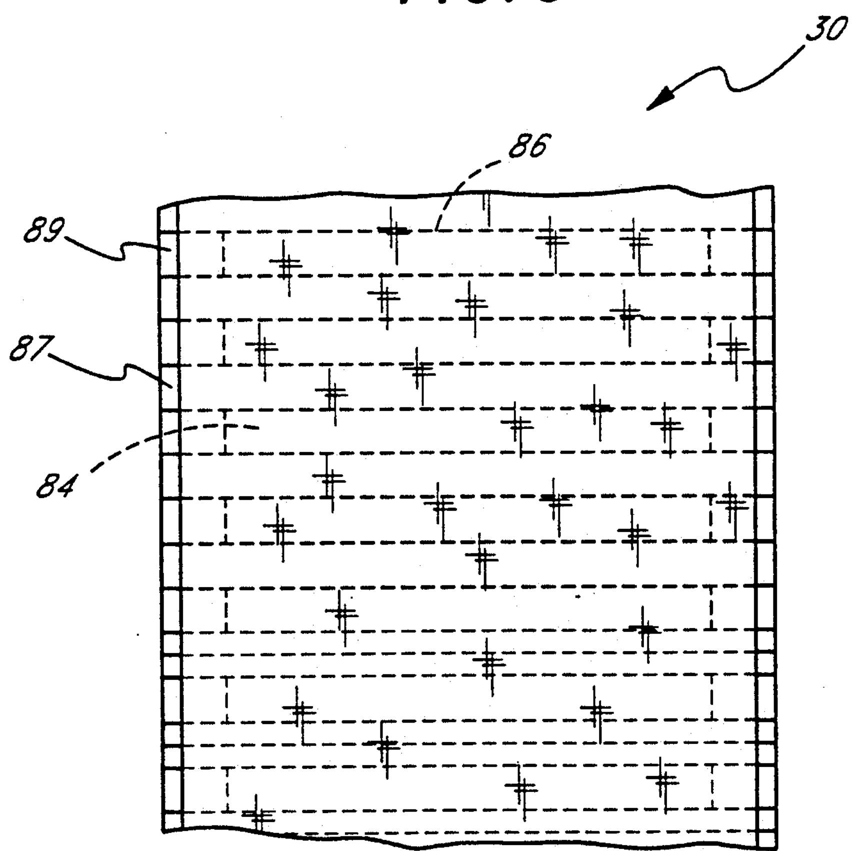
FIG. 7 is a detail of the rear of the sliding door.

Referring to FIGS. 6 and 7, the sliding door 30 comprises alternating double rows of long slats 80 and short spacers 82 joined by a flexible backing 84 extending the full length of the sliding door. The double rows of long slats 80 extend across and between the panels 24 into the channels 32 in the interior surfaces of the panels. Between each double row of long slats 80, two sections of double-rowed spacers 82 are disposed. Preferably, each pair of long slats 80 is joined together in a rigid fashion and, likewise, each pair of spacers 82 joins rigidly together. Thus, the sequence of alternating double rows of slats 80 or spacers 82 provides linear rigidity along the path of the guide channels 32. The flexible backing material 84 couples, and provides hinge points 86 between, each alternating rigid double row of long slats 80 and spacers 82.

Advantageously, the long slats 80 possess substantial resistance to bending about a vertical axis. Such inward bending is the primary source of stress from someone bumping into the front of the door 30, as the sides of the door are simply supported in the guide channels 32. To provide enhanced structural rigidity, the slats 80 have a semicircular cross-section, as seen in FIG. 6. The semicircular shape results in a favorable stiffness to cross-sectional area ratio, thus helping to minimize the weight of the door 30. Further adding to the structural rigidity, thin rigid strips 87 join each pair of slats 80 on the flat rear surface. Any localized contact at the front of the door 30 is thus absorbed by at least two long slats 80 joined by the thin strip 87. The double row of spacers 82 between each pair of slats 80 are similarly shaped and joined at their rear by a thin strip of rigid material 89. The slats 80 and spacers 82 are constructed of any suitable lightweight material such as wood or plastic. Preferably, the slats 80 and spacers 82 are wood, and the strips 87, 89 are thin strips of fabric. If plastic is used, there will be no separate strips 87, 89 but rather the pairs of slats 80 and spacers 82 will be rigidly molded together.

The spacers 82 are disposed at the left and right outermost width of the sliding door 30, and, along with the ends of the long slats 80, extend into the channels 32 on the interior of the panels 24. Elongated, rectangular-shaped voids 88 are formed between the spacers 82 on each side and between the adjacent long slats 80. The rectangular voids 88 thus formed expose spaced portions of the flexible backing 84 which connects the slats together.

Each pair of long slats 80 and spacers 82 mount to their respective connecting strips 87, 89 which are individually glued to the flexible backing 84 and otherwise not coupled to the adjacent strip. When the slats 80 and spacers 82 are arranged in this manner, they provide a somewhat rigid continuous line of slats for assisting in sliding the door 30 through the channel 32. In this respect, pushing on the handle at the first end 70 transmits forces along the connected double-rows of slats 80 and spacers 82, as well as the flexible backing 84, so that the sliding door 30 will not bind. The hinges 86 formed between the alternating double rows of long slats 80 and spacers 82 allow the sliding door 30 to conform to the arcuate shape of the channel 32 at the top of the cabinet 20.

The flexible backing 84 comprises a fabric, mesh, or screen suitable for adhering to the rear of the slats. Advantageously, the flexible backing 84 comprises a man-made fiber such as nylon. Preferably, the backing comprises perforated thin soft plastic material or transparant material which is relatively light and inexpensive. The alternating double rows of spacers 82, and the exposed voids 88 therebetween, reduce the overall weight of the door 30, and thus improves its maneuverability.

The exposure of the flexible backing 84 in an alternating pattern provides a design which is pleasing to the eye and which may be modified according to the particular color scheme desired. In addition, the backing 84 may be a somewhat transparent material, such as a large size mesh, allowing visual access to the contents of the storage cabinet 20 without opening the door 30.

In a preferred embodiment shown in FIGS. 8-11, improved shelving inserts 90 replace the simple ledges 60 described above. The inserts 90 fit over the inner surfaces of the walls 44, 48. Alternatively, the inserts 90 may be incorporated into the existing walls as integral components. The inserts 90 provide a convertible shelving configuration, allowing the insertion of variable thickness articles 64 without requiring a manual operation to switch from one size to another. In the preferred embodiment, each station 62 is capable of storing two thin articles 64*a* spaced apart or, alternatively, one thicker article 64*b*.

Figure 8:
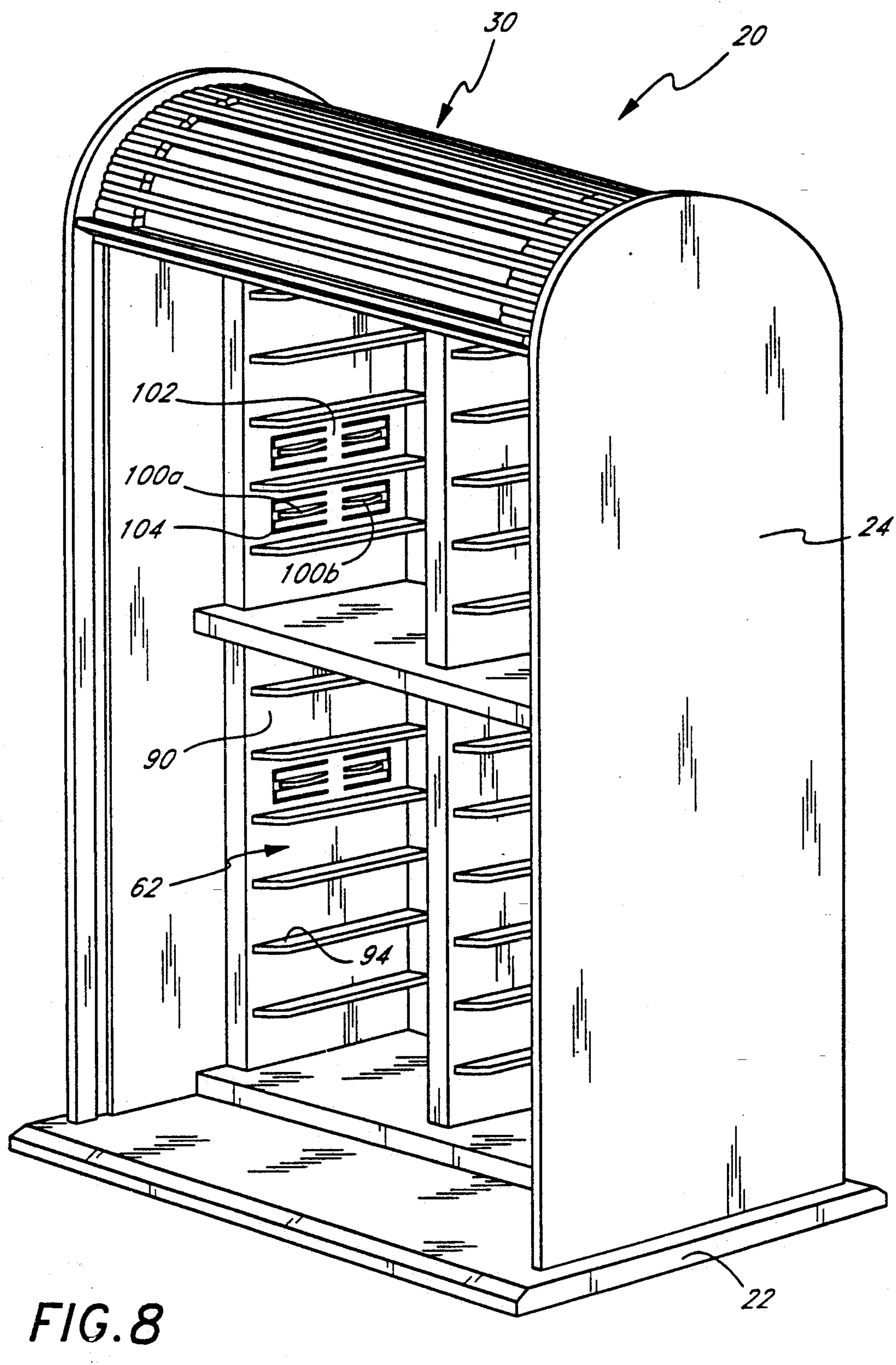
FIG. 8 is a perspective view of an alternative shelving arrangementin the cabinet of the present invention.

The inserts 90 are shown installed in a cabinet 20 in FIG. 8. The inserts 90 may mount to the outer walls 44 of the storage frame 28, or directly to the side panels 24, and to the center wall 48. In this respect, there are two inserts 90 facing each other in each quadrant 38*a–d* of the storage cabinet 20. The inserts 90 generally comprise a vertical support face 92, fixed ledges 94 and resilient fingers 100. The resilient fingers 100 normally extend from the vertical support face 92 inward into each article storage station 96 midway between the ledges 94 to provide secondary supports within each station for storing thin articles 64*a*. In this arrangement, each station initially comprises two "shelves" for storing thin articles 64*a*: one formed by the opposing ledges 94 and the other by the opposing fingers 100. The even vertical spacing of the ledges 94 and fingers 100 provides an equal sized slot for the two thin articles 64*a*. Alternatively, a thicker article 64*b* may be inserted into the "shelf" formed by the pair of fixed ledges 94 thus causing the resilient fingers 100 on each side of the station 96 to depress. With the fingers 100 depressed, the station 96 only holds one thick article 64*b*.

The present invention encompasses any number and combination of ledges 94 and fingers 100, from a situation with only fingers and no fixed ledges (maximum choice of article size) to one with no fingers and all ledges. The preferred arrangement provides a one-to-one ratio of fixed ledges 94 to fingers 100 is particularly suited to storing single and double compact disc cases.

Figure 9:
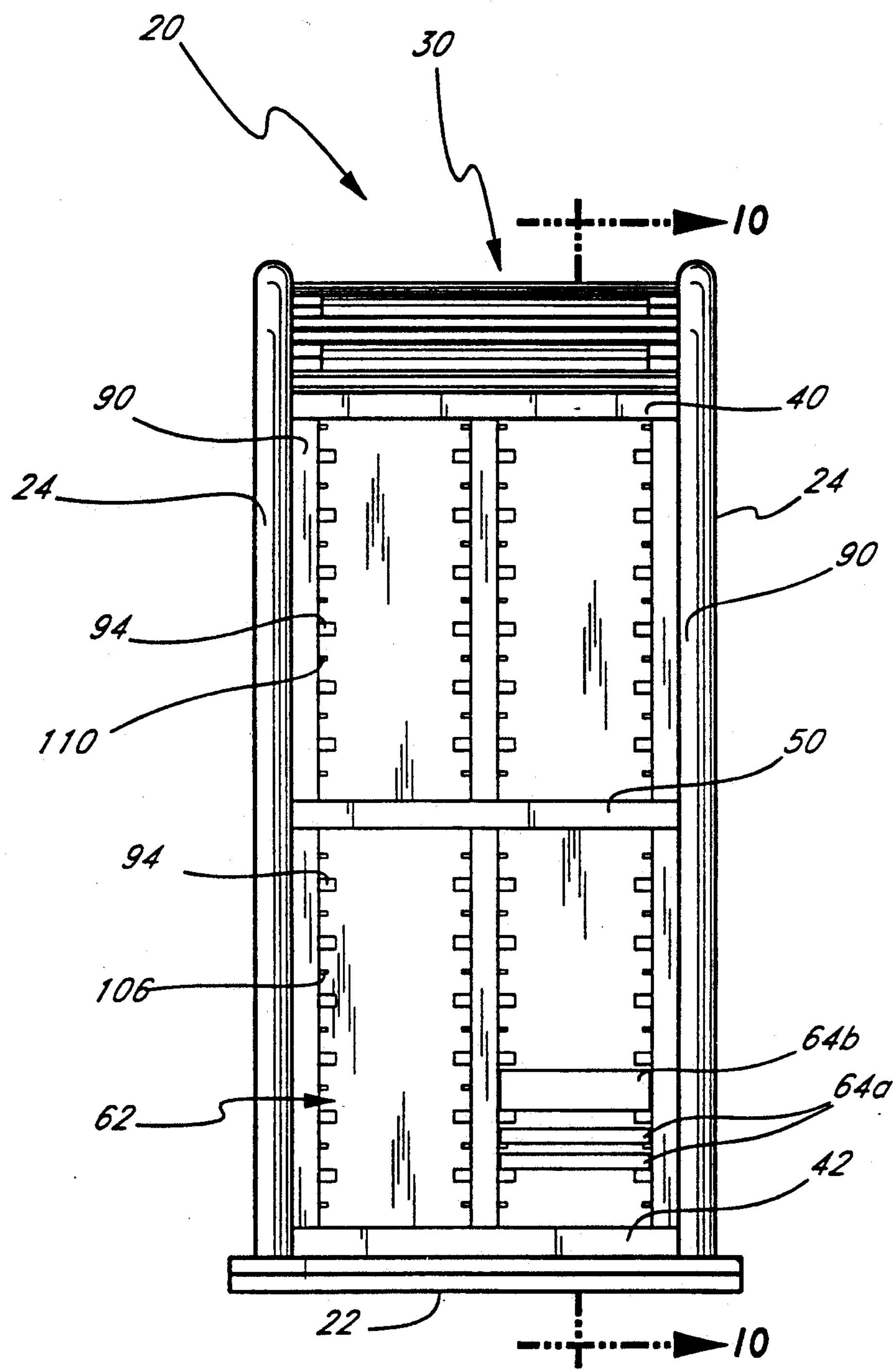
FIG. 9 is a front elevational view of the cabinet of FIG. 8.

As shown in FIG. 9, each station 96 is thus capable of storing two single CDs 64*a*, one on the ledges 94 and one on the fingers 100, or only one double CD 64*b* resting on the ledges 94 and depressing the fingers 100 back into the insert 90. The cabinet 20 thus provides storage capacity for any ratio of single to double CDs, a previously unavailable feature.

Figure 10:
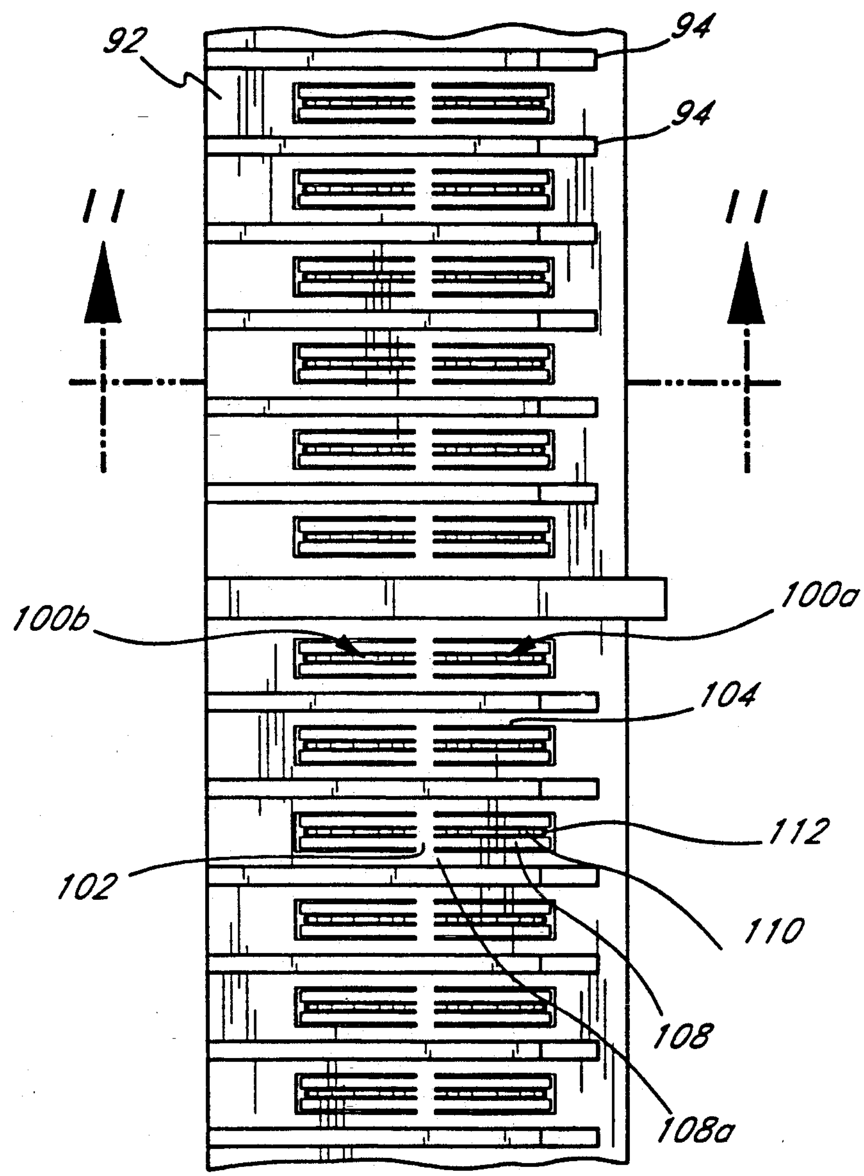
FIG. 10 is a side elevational view of the preferred ledge insert taken along line 10—10 of FIG. 9.
Figure 11:
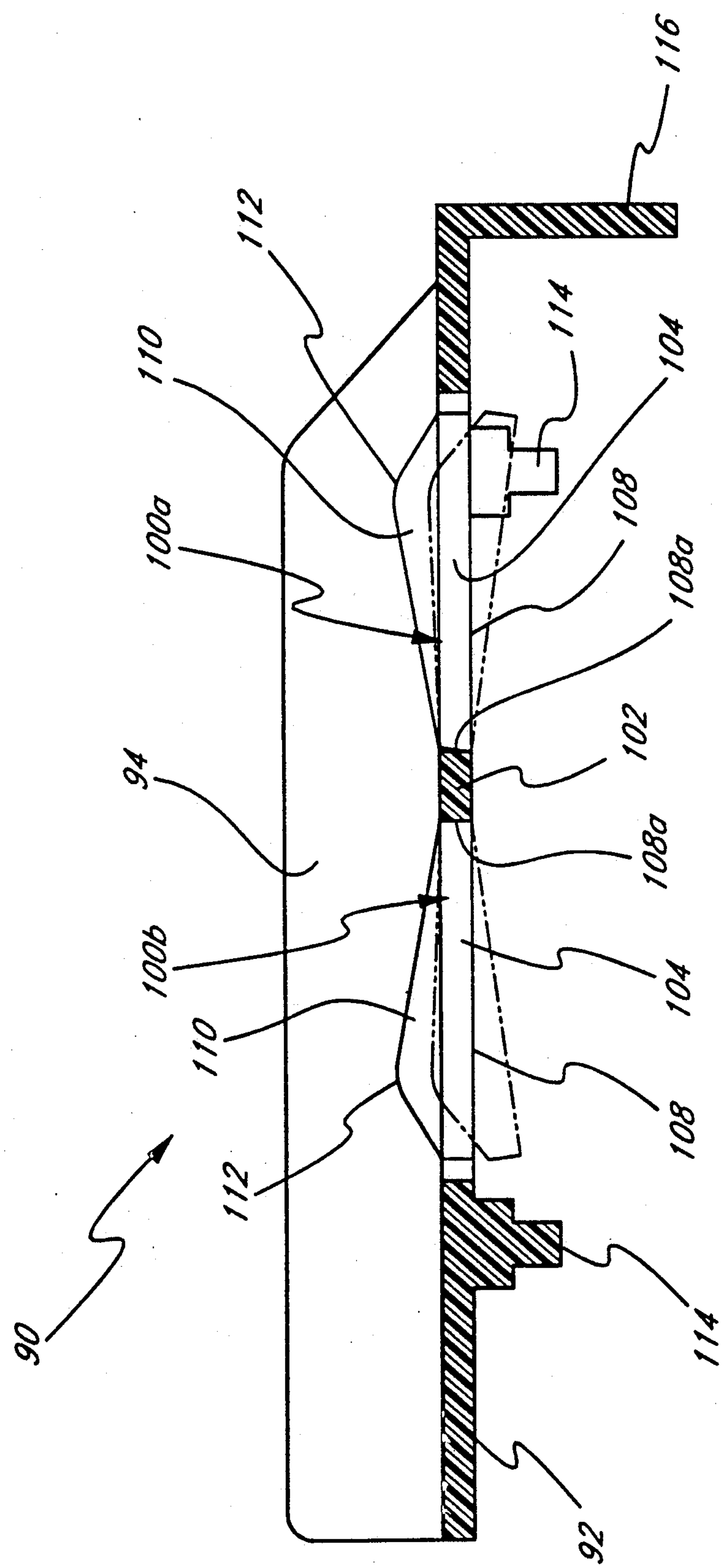
FIG. 11 is a cross-sectional view of the preferred storage ledges taken along line 11—11 of FIG. 10.

In each station 96, four resilient fingers 100 serve as a four-point single CD support. With reference to FIGS. 10 and 11, there are two fingers 100 per station 96 per insert 90 facing a complementary pair of fingers across the station. In the initial, undepressed condition, the fingers 100 extend into the station 96 to form the four-point support for single CDs 64*a*. The fingers 100 are connected to each insert 90 at a bridge 102, and thus are cantilevered from this location. Upon insertion of a double CD 64*b* into the station 96, the fingers 100 are forced outward from the station, generally bending near the bridge 102, as shown in dashed lines in FIG. 11.

Looking at one station 96 of an insert 90, one finger 100*a* extends horizontally forward from the bridge 102, while the second finger 100*b* extends from the same bridge rearward. Both fingers 100 generally extend parallel to the vertical support 92 of the insert 90. In the preferred embodiment, the bridge 102 has a thickness of at least ¼ inch, while each finger 100 extends approximately two inches from the bridge. The opposite ends of the fingers 100 are thus spaced apart a distance sufficient to provide support for a CD case inserted in the station 96. Additionally, the fixed ledges 94 are vertically spaced apart approximately one inch, or slightly more than the thickness of two single CD cases. Of course, these dimensions are representative of one embodiment only, many other dimensions are contemplated depending on the storage use.

Each finger 100 comprises a flattened base portion 108 and a tapered ledge 110. The base portion 108 is defined, and isolated structurally from the respective insert 90, by slits 104 on three sides. The slits 104 resemble elongated forks lying sideways whose open ends face each other across the solid bridge 102. The fourth side 108*a* of the base portion 108 transitions to the bridge 102. The tapered ledge 110 begins at the thickness of the bridge 102 and gradually tapers wider away from the vertical support face to a rounded apex 112 approximately 80% along the length of the finger 100 from the bridge. The tapered ledge 110 has a vertical thickness of approximately ⅛ inch centered on the base portion 108. The intersection of the base portion 108 and the bridge 102 comprises a region 108*a* about which the finger 100 pivots. Due to the long taper of the ledge 110, this region 108*a* presents a minimum of stiffness, or resistance to bending, about a vertical axis at that end.

The apexes 112 on each side of the station 96 provide the front and rear four-point support for single CDs 64*a* but may be depressed out of the way for double CDs 64*b*. The favorable tapering of the ledges 110 provides sufficient structural strength to support a single CD 64*a* inserted in the station 96. Conversely, a double CD 64*b* may be inserted into the station 96 and rest on the fixed ledges 94. The sides of the double CD 64*b* contact the resilient fingers 100 to cantilever them outward about the bridge 102 into a clearance space behind the inserts 90 formed by ridges 114. The double CD 64*b* smoothly cams the fingers 100 outward by contacting the rounded apexes 112 first. The thinned portion 108*a* of the fingers 100 proximate the bridge 102 allows this bending action with a minimum resistance. Additionally, the width of the base portion 108 of the fingers 100 provides a large amount of material to absorb the bending stresses without permanent deformation, especially with repeated use.

The resiliency of the fingers 100 creates a slight inward compressive force against double CDs 64b upon fully entering the station 96, loosely retaining double CDs 64b until removed manually. Thus, double CDs 64b are retained by friction within the stations 96 so as not to slide forward in case of movement of the cabinet 20. The apexes 112 extend far enough into the station 96 to securely support single CDs 64a, yet not too far to overstress the fingers 100 upon being bent outward by double CDs 64b. Thus the compressive force against the sides of double CDs 64b is light.

As mentioned above, two vertical columns of ridges 114 protrude from the side of the support face 92 opposite the station 96. In this respect, the ridges 114 abut the side wall 44 or center wall 48 and create a space into which the fingers 100 are depressed. A front flange 116 perpendicular to the vertical face 92 provides an installation stop against the respective wall 44, 48 and also serves the cosmetic purpose of hiding the edge of the wall. Preferably, the inserts 90 are molded plastic to obtain the benefits of low-cost manufacturing and reduced weight. It is understood that a mirror image exists across the station 96, with identical fingers 100 facing each other, and thus, in the preferred embodiment, the inserts 90 are interchangeable on the side walls 44 and center wall 48.

What is claimed is:

1. A storage cabinet comprising:

a base, two upstanding side panels, and a sliding door having horizontal slats affixed to a continuous flexible backing and sized to slide within guide channels on the side panels as the door is raised or lowered for alternately exposing and covering the interior of said cabinet and a plurality of spacers between the edges of the slats that also slide within the channels but do not extend across the entire width of the door, said slats and spacers comprising an alternating sequence of slats and spacers, and said guide channels having an inverted U-shape so that said door is movable from a closed position to an open position by sliding the door along the upper arcuate portion of the channels to the rear of the cabinet, wherein said alternating sequence of slats and spacers cooperate to define a series of voids between said spacers which expose portions of said backing and said backing is sufficiently transparent that said portions of said backing provide visual access to the contents of said cabinet without opening said door.

2. The storage cabinet of claim 1, wherein said sequence comprises two long slats separated by two aligned spacers.

3. The storage cabinet of claim 1, wherein each of said side panels further comprises a path connecting an outer edge of said side panel with said guide channel defined by said side panel, said path sized, shaped and orientated with respect to said guide channel such that said sliding door may be installed via said path after said base and said upstanding side panels have been assembled.

4. An article storage cabinet comprising:

a base supporting two upstanding side panels, an article storage frame between said side panels, said frame having walls, and said frame defining stations having article storing supports capable of supporting both thick or thin sized articles including resilient fingers extending a sufficient distance that thin articles are supportable thereon while thicker articles contact and displace said fingers upon insertion into said stations so that thicker articles are supported on another portion of said supports than said displaced fingers.

5. The cabinet of claim 4, wherein said fingers are cantilevered from the side walls of the frame and said supports include fixed ledges which extend into said stations.

6. The cabinet of claim 5, wherein thicker articles are supported on one of the group comprising non-displaced resilient fingers and fixed ledges.

7. The cabinet of claim 6, wherein said supports are integrally molded into inserts configured to mount to the walls of said frame.

8. The cabinet of claim 4 including a door sized to be received and slide in said panels and constructed from a series of horizontal slates joined to a continuous flexible backing.

9. A storage cabinet comprising:

a base, two upstanding side panels, and a sliding door having horizontal slats affixed to a continuous flexible backing and sized to slide within guide channels on the side panels as the door is raised or lowered for alternately exposing and covering the interior of said cabinet and a plurality of spacers between the edges of the slats that also slide within the channels but do not extend across the entire width of the door, said slats and spacers comprising an alternating sequence of slats and spacers, and said guide channels having an inverted U-shape so that said door is movable from a closed position to an open position by sliding the door along the upper arcuate portion of the channels to the rear of the cabinet, wherein each of said side panels further comprises a path connecting an outer edge of said side panel with said guide channel defined by said side panel, said path sized, shaped and orientated with respect to said guide channel such that said sliding door may be installed via said path after said base and said upstanding side panels have been assembled.

* * * * *